(12) United States Patent
Pettersson

(10) Patent No.: US 7,493,993 B2
(45) Date of Patent: Feb. 24, 2009

(54) BRAKE SYSTEM HAVING A REDUCED LENGTH AND AN AXIALLY MOUNTED ACTUATOR

(75) Inventor: Matti Pettersson, Helsingborg (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/213,079

(22) Filed: Aug. 26, 2005

(65) Prior Publication Data

US 2007/0045060 A1 Mar. 1, 2007

(51) Int. Cl.
 *F16D 55/08* (2006.01)
(52) U.S. Cl. .................................. 188/72.9; 188/106 F
(58) Field of Classification Search ...................... 92/63, 92/62, 93, 94, 167, 168; 188/72.9, 72.1, 188/72.4, 72.6, 73.1, 106 F
 See application file for complete search history.

(56) References Cited

U.S. PATENT DOCUMENTS

| 3,683,753 | A | * | 8/1972 | Johnson | 92/48 |
| 4,345,672 | A | * | 8/1982 | Nakasu | 188/1.11 R |
| 5,515,949 | A | * | 5/1996 | Baumgartner et al. | 188/72.9 |
| 6,012,378 | A | * | 1/2000 | Hicks | 92/63 |
| 6,234,587 | B1 | * | 5/2001 | Gerum et al. | 303/118.1 |
| 6,267,043 | B1 | * | 7/2001 | Plantan et al. | 92/63 |
| 6,314,861 | B1 | * | 11/2001 | Smith et al. | 92/62 |
| 6,626,083 | B2 | | 9/2003 | Bowyer | 92/63 |
| 6,694,866 | B2 | * | 2/2004 | Smith et al. | 92/98 R |
| 7,028,814 | B2 | * | 4/2006 | Fisher | 188/72.9 |
| 2004/0134722 | A1 | | 7/2004 | Ortegren et al. | 188/72.1 |

* cited by examiner

*Primary Examiner*—Xuan Lan Nguyen
(74) *Attorney, Agent, or Firm*—St. Onge Steward Johnston & Reens LLC

(57) ABSTRACT

The invention relates to a heavy vehicle brake system and in particular, a brake system having a reduced length and an axially mounted actuator while delivering the same clamp force. A brake system for a vehicle including an actuator having a service chamber and a parking chamber and the actuator operates along an axis through the service chamber and the parking chamber. The actuator has an overall length of less than approximately 200 millimeters along the actuator axis. The brake system also includes an application unit actuated by the actuator. The application unit has a force multiplying device for generating a clamp force. The clamp force is exerted in a direction substantially parallel to the axis of the actuator.

26 Claims, 8 Drawing Sheets

Prior Art Dimensions

| Prior Art Size sq. in. | Service Stroke Length in. | Service Stroke Length mm | Parking Stroke Length in. | Parking Stroke Length mm | Total Actuator Length (L) in. | Total Actuator Length (L) mm | Service Chamber Diameter ($D_S$) in. | Service Chamber Diameter ($D_S$) mm |
|---|---|---|---|---|---|---|---|---|
| 16/24 | 2.25 | 57 | 2.25 | 57 | — | — | 7.5 | 191 |
| 20/24 | 2.25 | 57 | 2.25 | 57 | 8.5 | 216 | 7.5 | 191 |
| 20/30 | 3.00 | 76 | 3.00 | 76 | 9.6 | 244 | 8.3 | 211 |
| 24/24 | 2.25 | 57 | 2.25 | 57 | 8.5 | 216 | 7.5 | 191 |
| 24/24 | 2.50 | 64 | 2.50 | 64 | 8.9 | 226 | 7.4 | 188 |
| 24/30 | 2.50 | 64 | 2.50 | 64 | 9.0 | 229 | 8.4 | 213 |
| 24/30 | 3.00 | 76 | 3.00 | 76 | 9.6 | 244 | 8.3 | 211 |
| 30/30 | 2.50 | 64 | 2.50 | 64 | 9.0 | 229 | 8.3 | 211 |
| 30/30 | 3.00 | 76 | 3.00 | 76 | 9.5 | 241 | 8.3 | 211 |
| 30/36 | 2.50 | 64 | 2.50 | 64 | 9.6 | 244 | 9.2 | 234 |
| 30/36 | 3.00 | 76 | 3.00 | 76 | 10.9 | 277 | 8.2 | 208 |
| 36/36 | 3.00 | 76 | 3.00 | 76 | 10.4 | 264 | 9.4 | 284 |

Invention Dimensions

| | Service Stroke in. | Service Stroke mm | Parking Stroke in. | Parking Stroke mm | Total Actuator Length in. | Total Actuator Length mm | Service Chamber Diameter in. | Service Chamber Diameter mm |
|---|---|---|---|---|---|---|---|---|
| Invention Alternative to Prior Art 2424 Brake | | | | | | | | |
| 35/35 | < 2.25 | < 57 | < 1.18 | < 30 | < 7.9 | < 200 | > 7.5 | > 191 |
| Invention Alternative to Prior Art 3030 Brake | | | | | | | | |
| 43/43 | < 1.75 | < 40 | < 1.18 | < 30 | < 7.1 | < 180 | > 8.4 | > 213 |

FIG. 8

BRAKE SYSTEM HAVING A REDUCED LENGTH AND AN AXIALLY MOUNTED ACTUATOR

FIELD OF THE INVENTION

The invention relates to a heavy vehicle brake system and in particular, a brake system package having a reduced length and an axially mounted actuator while delivering the same clamp force, as compared to currently known designs.

BACKGROUND OF THE INVENTION

A brake system for a vehicle, such as a bus, truck or the like, typically includes an actuator and an application unit which presses friction material into contact with a brake disc or a brake drum assembly. Conventional brake actuators have both a service brake actuator for actuating the brakes under normal driving conditions and an emergency or parking brake actuator which causes actuation of the brakes when power is removed. The parking brake actuator may include a strong compression spring which forces application of the brake when air is released. This is often referred to as the spring brake. The emergency or parking brake may be a diaphragm or piston type brake.

Application of either the service or spring brakes is accomplished via a brake application unit which is activated by the service or spring actuator to apply friction material to a hub or disc.

Typically, the spring brake actuator is paired with the service brake actuator. When full pressure is applied to the spring brake actuator, air pressure acting against a diaphragm compresses the compression spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion may serve both as a parking brake and as an emergency brake.

Such common piggy back or combination designs lead to additional axial length of the brake actuator and the brake system. Further, air brake systems are typically designed with extra long strokes. Long stroke brakes provide heavy vehicle brakes with a greater margin of effectiveness for thick layers of friction material and to better combat brake fade. Stroke length relates to the performance of the service chamber.

Several trends in vehicle design are leading to changes in air brake actuator design. Increasingly, vehicle manufacturers are requiring additional features and capabilities in brake systems, while at the same time demanding that the brake system be provided in a smaller package while generating the same clamp force. Ideally, these demands will not necessitate a redesign of the application unit to accommodate the application of an input force at a substantial angle to the axis of operation of the application unit.

At the same time, the dimensions of the brake arrangements in the vehicle chassis are often critical. Modern brake systems for heavy vehicles often require space consuming electronic components such as onboard diagnostic sensors, electric motors and antilock brake modulators. These components, often necessary by regulation or by customer demand, occupy much of the limited space within the wheel well. In addition, suspension systems are also growing in complexity and size and in the number of components, further reducing the available space.

As wheel sizes remain constant, it is thus desirable to reduce the dimensions of the brake system. A particular requirement of vehicle manufacturers is reduction of actuator axial length. In the prior art, this has been accomplished with smaller caliper designs and reduction of excessive clearance between the pad and the disk.

As the stroke length of the actuator cylinder is reduced, the overall axial length of the brake system may also be reduced. Brakes with reduced axial dimensions are more easily adapted to different vehicles.

One approach to meet the needs of vehicle manufacturers has been to mount the actuator radially, at an angle approaching perpendicular to the application unit's axis of operation. Such radially mounted actuators may reduce the length of the brake system. A problem with this solution, however, is that it requires a redesign of the application unit in order for the application unit to generate sufficient clamp force from a radially applied input force.

While standard actuators operate along a substantially parallel axis with respect to the application unit, a radially mounted actuator operates at a greater angle with respect to the operation axis of standard application units. Further, radially mounted actuators are low volume parts compared to prior art axially mounted actuators, and are thus higher in cost. In addition to requiring a redesign of the application unit, radially mounted actuators also require alternative calipers and mounting apparatus.

The invention provides a compact brake system having a reduced axial dimension while maintaining substantially parallel axes of operation for the application unit and the actuator by shortening the stroke length of the actuator. The shortened stroke length may be as short as approximately 40 millimeters for a service brake. Similarly, the stroke length of the parking or emergency brake may be shortened to approximately 30 millimeters or less for additional reduction of axial length of the brake system.

Such a compact brake system can fit modern system architecture, and is particularly adaptive to the more restrictive space on front axle installations. Such a compact spring brake also may be suitable for sliding and fixed caliper applications and may be adapted for integrated antilock brake modulators.

Shortening the stroke length may reduce the mechanical advantage in the application unit. The mechanical ratio may be reduced to approximately 10:1 from a standard ratio of 15:1 for a conventional 24/24 spring brake chamber, an approximately 33% reduction in stroke length.

To overcome the decrease in mechanical advantage, the diameter of the actuator may be increased. A larger diameter actuator may house a larger diaphragm. A larger diaphragm is capable of generating increased actuator forces. Modifications may also be made to the application unit to compensate for the shorter stroke length and decreased mechanical advantage. The modifications could include altering the active length of the application unit lever and/or changing the eccentric ratios to alter the force multiplier ratio of the application unit.

In the past it has been normal to have a certain overcapacity regarding the stroke length of the actuator. The overcapacity provides the actuator sufficient stroke length to guarantee that the brake is actuated even as the friction material is consumed, if, for example, the adjustment mechanism fails.

The over-capacity of the stroke length has meant that the actuator must also have an over-capacity with regard to the actuator dimensions. Thus, the axial length of the brake system is larger than it would have been without the over-capacity.

A sensing system to monitor the stroke of the actuator and provide a warning if the stroke differs from a reference value could reduce or eliminate the need for over-capacity. Because a possible malfunction may be detected early, the overcapacity of the stroke actuator may be reduced substantially, thus allowing the axial length of the actuator to be safely decreased.

According to the invention, the concept of having a rather large over-capacity of the stoke length of a brake actuator may be replaced by the technique of constantly monitoring the exact position of the brake actuator. Thus, the need for over-capacity of the brake actuator is avoided.

SUMMARY OF THE INVENTION

Accordingly, it is an object of the invention to provide a brake system having reduced axial length as compared to currently known designs.

Another object of the invention is to provide a brake system having a shortened stroke length as compared to currently known designs.

It is also an object of the invention to provide a brake system having an actuator operable on a substantially parallel axis of operation as the application unit.

It is a further object of the invention to provide a brake system including an actuator having a shortened stroke length as compared to currently known designs packaged with a standard application unit.

Yet another object of the invention is to provide a brake system having a parking brake with a shorter stroke length than the stroke length of the service brake.

Still another object of the invention is to provide a brake system having its center of gravity shifted closer to the caliper interface as compared to currently known designs.

These and other aspects of the invention are achieved by provision of a brake system for a vehicle including an actuator having a service chamber and a parking chamber where the actuator operates along an actuator axis through the service chamber and the parking chamber. The actuator has an overall length of less than approximately 200 millimeters along the actuator axis. The brake system also, includes an application unit actuated by the actuator. The application unit has a force multiplying device for generating a clamp force. The clamp force is exerted in a direction substantially parallel to the actuator axis.

The application force may be exerted in a direction substantially parallel to the actuator axis so that the application unit does not require a modification or redesign to accept an input force and generate an application force. Substantially parallel may be defined as less than approximately 10 degrees from parallel.

It is preferable that the brake system actuator comprise a stroke length. It is also preferable that the application unit force multiplying device includes a lever and at least two bearing surfaces. The application unit may be of a type suitable to and usable with an actuator having an overall length greater than approximately 200 millimeters measured along the actuator axis. The brake system may have a center of gravity closer to a caliper interface than a brake system with an actuator having an overall length of greater than approximately 200 millimeters measured along the actuator axis.

The application unit is actuated by an input force from the actuator to generate a clamp force. The input force is transmitted by the actuator over the length of the stoke. It is preferable that the actuation force may be transmitted by a push rod over the service stroke length and the parking stroke length, wherein the parking stroke length is less than the service stroke length, such that overload associated with compounding of a service force and a parking force may be avoided. The brake system may comprise an anti-compounding valve, such that when the actuation force is transmitted by the push rod over the service stroke length and the parking stroke length, the overload associated with compounding of a service force and a parking force may be avoided. The brake system may also comprise stroke and force sensors, such that when the actuation force is transmitted by the push rod over the service stroke length and the parking stroke length, the overload associated with compounding of a service force and a parking force may be avoided.

The force multiplying device of the application unit may be adapted to the input force and the lever and the at least two bearing surfaces are exchangeable in order to alter the force multiplication of the application unit. For instance, an active length of the lever and/or at least one of the bearing surfaces can be adapted to the input force. The active length of the lever and/or at least one of the bearing surfaces can be adapted to provide a constant input force at a given pressure independent of the stroke length for the actuator acting on the lever.

While the actuator may be an electromagnetic device, it is preferable that the actuator is a pneumatic cylinder. The actuator or input force is generated by the compressed air entering the service chamber, and the input force is a function of the diameter of the service chamber. The service chamber may have a diameter of greater than approximately 191 millimeters. It is also envisioned that under certain circumstances the service chamber may also have a diameter of greater than approximately 213 millimeters. The parking chamber may also have a diameter of less than approximately 213 millimeters.

It is preferable that the actuator has a stroke length of less than approximately 57 millimeters, but the stroke length may also be less than approximately 40 millimeters. The actuator may also have an overall length of less than approximately 182 millimeters measured along the actuation axis. It is also envisioned that the actuator have an overall length of less than approximately 160 millimeters measured along the actuation axis.

Preferably, the stroke length is a service stroke length and the brake system also includes a spring stroke length. The spring stroke length may be less than the service stroke length and be less than approximately 40 millimeters. The parking chamber may also comprise a piston type parking brake and the piston type brake may have a parking stroke length of less than approximately 30 millimeters.

The brake system may also have sensors. The sensors may be inbuilt in the actuator. The sensors may also be anti-lock brake sensors. The sensors may also be part of a sensing system. The sensing system may include a means to sense the position of an actuating stroke and may also include a means to sense at least one further feature of the brake system correlated with the actuating stroke. The sensing system may also have a means for comparing the value of the actuating stroke to a reference value for the sensed further feature of the brake system and issuing a warning signal if the actual value of the actuation stroke deviates more than a predetermined value from the reference value. The sensing system of the brake system may comprise at least one force sensor, such that the overload associated with compounding of a service force and a parking force is avoided.

The invention and its particular features and advantages will become more apparent from the following detailed description considered with reference to the accompanying drawings.

BRIEF DESCRIPTION OF THE DRAWINGS

FIG. 8 is a chart comparing standard relationships between dimensions of prior art actuators compared to the actuator of the compact brake system of FIG. 1.

DETAILED DESCRIPTION OF THE DRAWINGS

Figure 1:
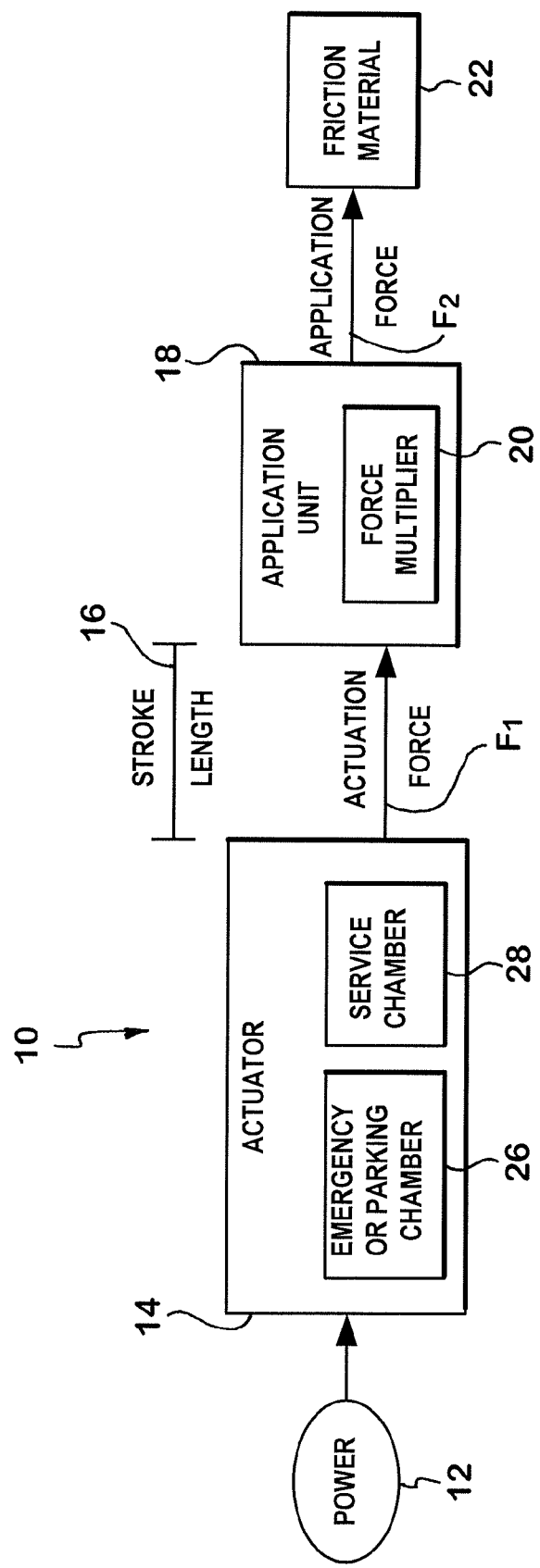
FIG. 1 is schematic of the compact brake system according to the invention.
Figure 2:
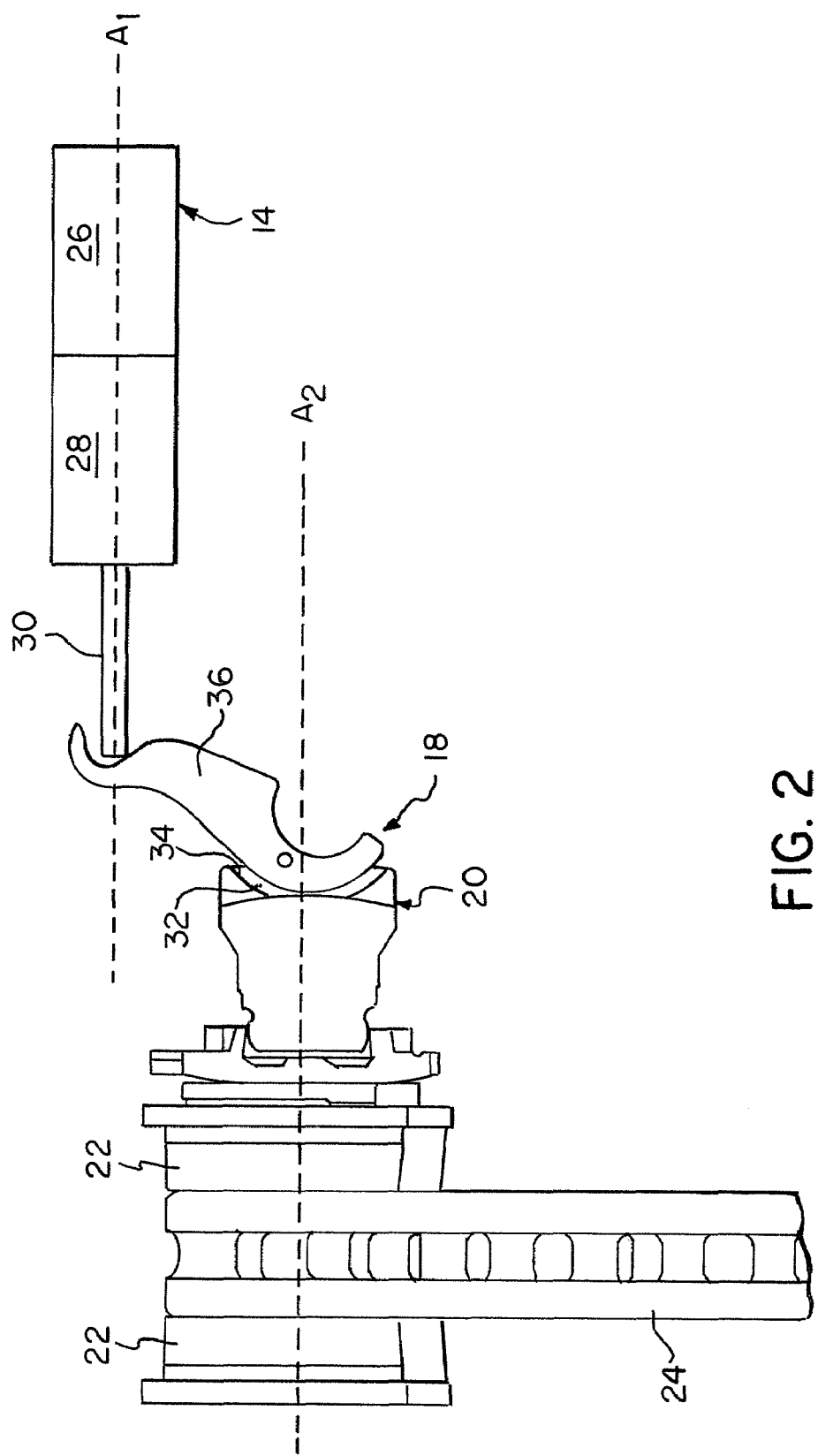
FIG. 2 is a side view of the compact brake system as illustrated in FIG. 1, utilized on a disc brake.

The present invention relates to a compact brake system, referring generally to FIGS. 1-5. The brake system, illustrated schematically in FIG. 1, is indicated as 10. The brake system includes a source of power 12 (FIG. 1) to an actuator 14. The actuator 14, over the length of its stroke 16, transfers an input or actuation force $F_1$ to an application unit 18 having a force multiplier 20. The application unit 18, having received the input force $F_1$, transfers an application or clamp force $F_2$, to friction materials 22 which act upon a disc or drum brake assembly. In an exemplary embodiment illustrated in FIG. 2, the compact brake system 10 is part of a disc brake and the friction material 22 acts upon a brake disc 24.

The actuator is provided with an emergency/parking chamber 26 and a service chamber 28. The actuator 14 will operate along an actuation axis $A_1$, shown in FIG. 2, such that the actuator is coupled between the input force 12 and the application unit 18. The application unit acts along an application axis $A_2$, the actuation axis $A_1$ may be substantially parallel to the application axis $A_2$ (see FIG. 2). If the axes were not substantially parallel, the application unit 18 may require modification or redesign in order to transfer a sufficient clamp force $F_2$.

The source of initial power 12 may be electromagnetic or hydraulic power and the actuator 14 thusly would be of a type which generates an input force $F_1$ from electromagnetic or hydraulic energy. However, in a preferred embodiment, the initial energy is pneumatic and the actuator 14 will receive compressed air as initial energy.

In an exemplary embodiment, compressed air enters the service chamber 28 of the actuator and acts on a diaphragm (not shown) within the service chamber 28. The diaphragm flexes, motivating a push rod 30 (FIG. 2) a predetermined stroke length 16, to generate an input force $F_1$ transferred by the push rod to the application unit 18. The input force $F_1$ is thus a function of both the diaphragm size and of the stroke length.

Figure 3:
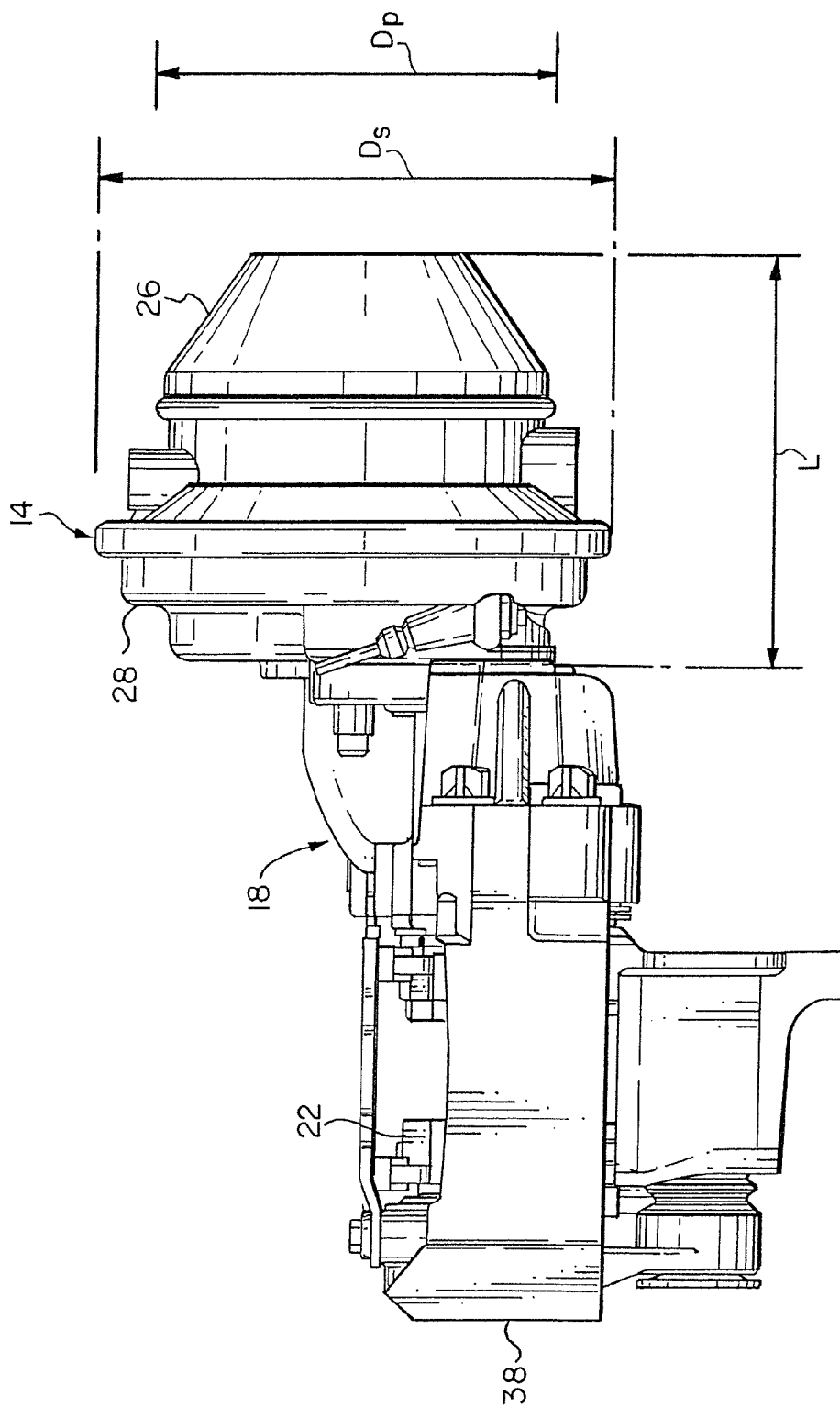
FIG. 3 is a side view of the compact brake system as illustrated in FIG. 1, installed on a disc brake caliper.

Referring to FIG. 3, the brake system may be installed on a disc brake caliper 38. The axial length of the actuator 14 is indicated as L and the diameter of the service chamber 28 is indicated as $D_S$. The greater the diameter of the service diaphragm, the greater the input force $F_1$ which can be generated. Also, a greater diameter service diaphragm requires a greater diameter $D_S$ of the service chamber 28. A shorter stroke length of the push rod 30 allows the actuator to have a reduced overall length L along its actuation axis $A_1$ but also reduces the mechanical advantage of the actuator 14. The invention brake may have an increased service diaphragm diameter, and thus an increased service chamber diameter $D_S$ to compensate.

Another benefit of the increased service chamber diameter $D_S$ is the reduced need for a bulky parking chamber 26. While the parking diaphragm may be the same size or a greater size than the service brake diaphragm sizes in prior art brake systems, the parking chamber 26 overall size may be reduced over prior art systems. A reduced overall sized parking chamber further reduces mass and axial length of a brake system compared to prior air brake assemblies.

The reduced axial length of the invention also moves the center of gravity of the braking system closer to the interface of the actuator and the caliper. The brake system is unsprung mass and is exposed to high accelerations. Shifting the center of gravity towards the caliper may reduce the risk of fatigue ruptures of the actuator chambers and the fixation bolts. This improved center of gravity may also reduce the load on the caliper guiding bearings, thus reducing the risk of their failure.

Figure 4:
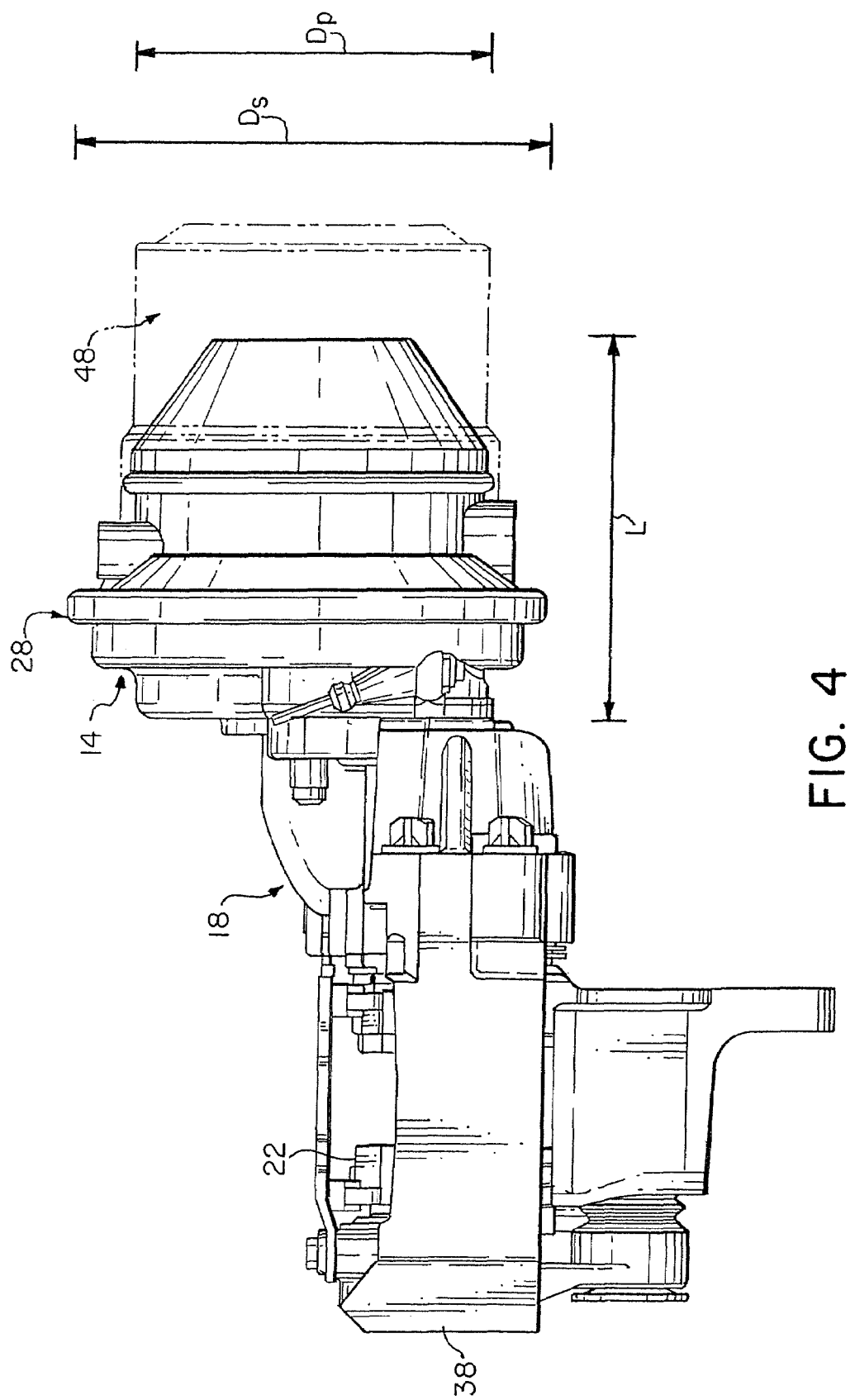
FIG. 4 is a side view of the compact brake system installed on a disc brake caliper, as illustrated in FIG. 1, superimposed over a prior art rear axle brake installation.

FIG. 4 compares the invention installed on a disc brake assembly to a prior art rear installation assembly having a prior art actuator 48. FIG. 4 illustrates that the reduction of the length of the actuator L reduces the overall length of the brake assembly. The reduction in actuator length L partially results from a reduced parking stroke length. In addition to the reduced parking stroke length, FIG. 4 also shows a parking chamber diameter $D_P$.

Figure 5:
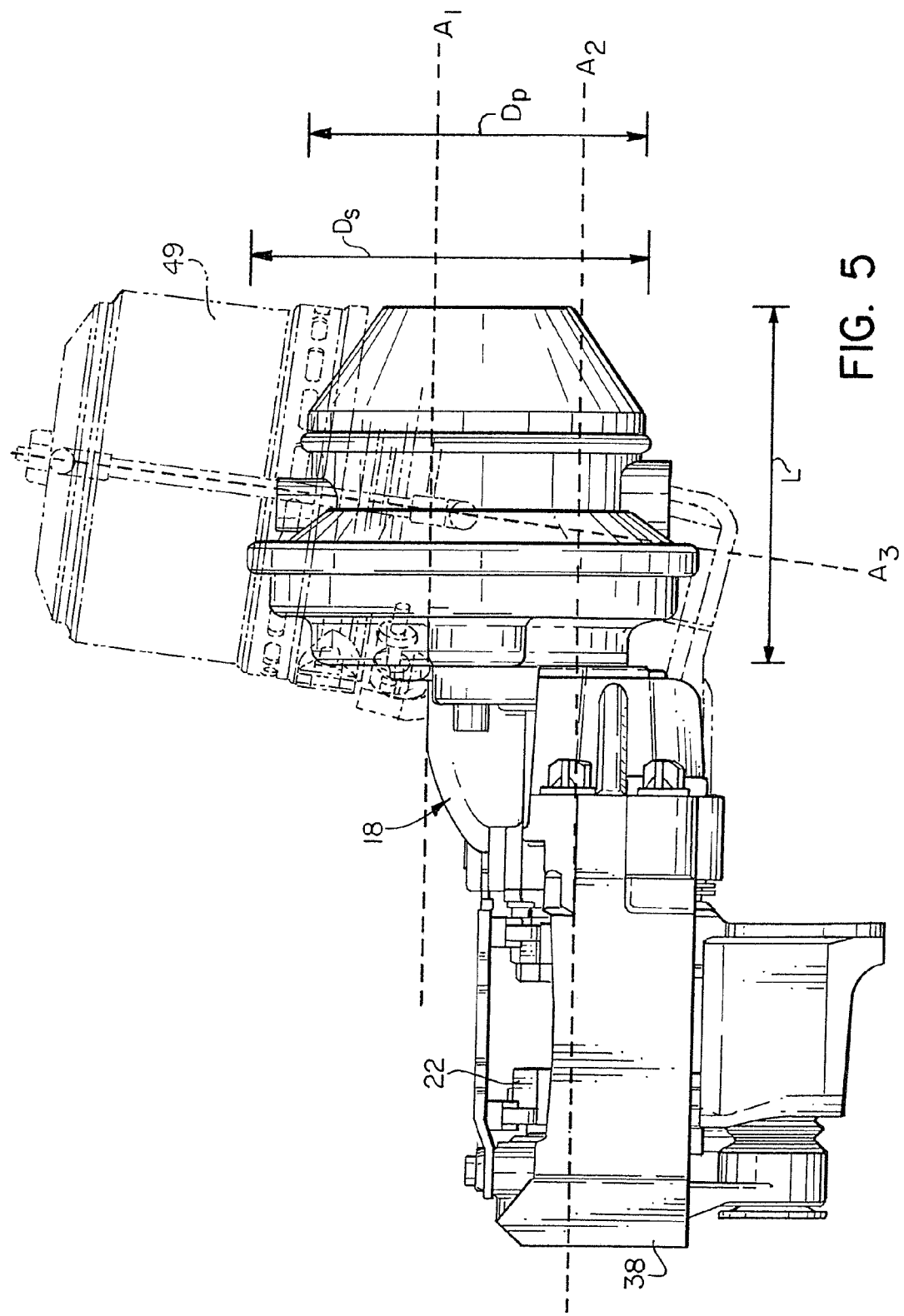
FIG. 5 is a side view of the compact brake system installed on a disc brake caliper, as illustrated in FIG. 1, superimposed over a prior art front axle brake installation.

FIG. 5 compares the invention installed on a front disc brake assembly to a prior art front brake assembly. The prior art front assembly includes a prior art radially mounted actuator 49. Radially mounted actuators operate along an axis $A_3$ which is not substantially parallel to the axis $A_2$ of operation of the application unit 18. Radially mounted prior art actuator 49 operational axis $A_3$ is often at a significant angle to the application unit 18 axis of operation. This angle, which approached perpendicular to the axis of operation of the application unit 18, requires that the application unit 18 be modified to convert an input force $F_1$ to a clamp force $F_2$.

The reduction in the overall size of the parking chamber is also shown in FIG. 5. A reduced sized parking chamber has greater significance in a front brake assembly. Front assemblies have greater space restrictions than rear assemblies but also play a smaller role in parking and emergency braking duties. An actuator having a reduced parking stroke length and/or a reduced parking chamber size may still generate sufficient force for emergency/parking duties where the parking and service chambers work in tandem.

The so called "compounding effect" is a problem associated with prior art combination brakes. Compounding occurs, when, for example, a vehicle is parked and the parking brake is applied while the service brake is still engaged. This may occur in the case of a failure, or simply because the driver may still have his foot on the brake pedal when engaging the parking brake. The result of the compounding of the service and parking braking may be bent chamber push rods, broken slack adjuster, damaged brake shoes or pads or even cracked brake drums or discs.

Prior art attempts to overcome this problem have been to strengthen the calipers and application units. These efforts have resulted in added mass, bulk and cost to the brake system. Another means employed in the prior art to overcome the compounding effect is the use of an anti-compound valve system. An anti-compound valve system senses the application of the service brake and prevents full application of the parking brake while the service brake is engaged. Avoiding compounding reduces the need to have added mass and bulk in the brake system as protection from compounding. The invention may use an integrated anti-compound valve to decrease the problems associated with compounding.

A shortened parking stroke length may also provide the added benefit of reducing the compounding problems associated with prior art combination brakes. A shortened parking brake stroke length may avoid the detrimental effects of compounding by allowing the parking stroke length to work in conjunction with the service brake stroke length for emergency/parking braking without overwhelming the braking system. This is possible because the reduced stroke length parking brake has a reduced limited capacity on its own.

The invention reduces the axial length of the brake system while still generating sufficient clamp force $F_2$ to operate the brake. The invention allows an axially mounted actuator to be used for space restricted installations without the complications associated with prior art radially mounted actuators 49. The invention operates with application units which are suitable to and usable with actuators having an axial length L greater than approximately 200 millimeters.

Accordingly, in a preferred embodiment, where the actuator 14 has an axial length L along the actuation axis $A_1$ of less than approximately 200 millimeters, the service chamber 28 of the actuator will have a diameter $D_S$ of greater than approximately 191 millimeters. Under certain circumstances, the overall length L of the actuator 14 may be reduced to approximately 182 millimeters or even to approximately 160 millimeters while the service chamber diameter $D_S$ may be greater than approximately 213 millimeters. However, it is also desired that the brake system is operable for heavy vehicles, and thus is capable of providing sufficient clamp force $F_2$ for service and parking duties to the brake assemblies' friction material to serve as an alternative to prior art brake assemblies.

The actuator 14 may generate an input force for dual purposes of service braking and parking/emergency braking. It is preferable that the actuator has a stroke length for the service brake less than approximately 57 millimeters, but the stroke length may be less than approximately 40 millimeters under certain circumstances. The emergency or parking chamber 26 of the actuator may be either a diaphragm or a piston type brake. The spring stroke length of the parking brake may be less than approximately 30 millimeters. A piston stroke length may have a parking stroke also of less than approximately 30 millimeters. A piston parking brake having a reduced stroke length further provides for a parking brake chamber 26 having a reduced overall size as illustrated in FIGS. 4 and 5.

FIG. 8 is a comparison between the specifications of prior art brake chambers with the specifications of embodiments of the invention brake chambers. An invention brake assembly that generates sufficient service clamp force to be an alternative to standard prior art brake assemblies may have an actuator that benefits from a reduced stroke service and parking length, reduced axial length and a reduced parking chamber overall size while having an increased service chamber diameter.

For example, a brake actuator in accordance with the present invention that could serve as an alternative to a prior art 24/24 brake actuator may have dimensions smaller than, but performance greater than a prior art 16/24 brake chamber as shown in FIG. 8. Thus, an invention brake actuator that could serve as an alternative to a prior art 24/24 brake actuator may have a service brake stroke length of less than approximately 57 millimeters, a parking brake stroke length of less than approximately 40 millimeters, a total chamber length of less than approximately 200 millimeters, a service chamber diameter at the rolled seal of the chamber of greater than approximately 191 millimeters and a parking chamber diameter of less than approximately 191 millimeters. Such an alternative to a 24/24 prior art brake made according to this invention could be approximately 35/35. The first two numbers signify the square inch measurement of the service diaphragm and the last two numbers signify the square inch measurement of the parking diaphragm.

Similarly, a brake actuator in accordance with the present invention that could serve as an alternative to a prior art 30/30 brake actuator. Such an alternative brake to a 30/30 actuator could also have sufficient service performance, while having reduced axial length, reduced service and parking stroke length, and a reduced parking chamber overall size while having an increased service chamber diameter. For example, a brake actuator in accordance with the present invention that could serve as an alternative to a prior art 30/30 brake actuator may have a service stroke length of less than approximately 40 millimeters, a parking stroke length of less than 30 millimeters, a total chamber length of less than approximately 182 millimeters, a service chamber diameter at the rolled seal of the chamber of greater than approximately 213 millimeters, and a parking chamber diameter of less than approximately 213 millimeters. An example of such an alternative invention brake actuator could be 43/43.

There exists a relationship between stroke length and diaphragm size, with there generally being reduced capacity to generate an input force as stroke length is decreased. However, where a reduced stroke is utilized, the reduction in input force capacity can be overcome if a larger diameter diaphragm is employed. For instance, an actuator having a reduced stroke length can generate a clamp force comparable to an actuator having a standard stroke length. This is possible because a decreased stroke length may be compensated for with an increased sized diaphragm. Thus, the axial length of the brake system and the diameter dimensions of the actuator may be affected.

As the actuator generates the input force $F_1$, the magnitude of the force tends to decrease over the length of the stroke. Thus the application unit 18 includes a force multiplier 20 which helps to compensate for this decrease in input force $F_1$. The force multiplier may include a lever 36 which receives the input force $F_1$ and at least two bearing surfaces. A first bearing surface 32 may be a surface on the lever 36 and a second bearing surface 34 may be on a bearing member within the application unit. It is envisioned that any known force multiplier may be used.

As is disclosed in co-pending and co-owned U.S. application Ser. No. 10/470,665, by varying certain radii and offset distances on the bearing surfaces and/or by varying the active length of the lever, it is possible to vary the force multiplication characteristics of the application unit 18.

In a preferred embodiment of a brake system, the force transmitted to the friction materials 22 should not vary and may be independent of the stroke length of the actuator. The input force $F_1$ is dependent on the stroke length of the push rod, and the input force $F_1$ generally follows a sloping curve, having a stronger inclination at the beginning of the stroke length. By making the variations to the radii and offset distances on the bearing surfaces and/or by varying the active length of the lever, it is possible to form a clamp force curve which is a mirror image of the characteristic of the input force curve. The result of the two characteristics will be a force executed on the friction material 22 which is independent of the stroke length of the actuator.

Application Ser. No. 10/470,665 also discloses application unit 18 in module form so that it is easy to change the lever and/or the bearing surfaces in order to make the alterations of the force multiplication independent of the stroke length.

Prior art brake systems often include an over-capacity in the stroke length of the actuator to ensure that the brake is actuated even as the friction material is consumed. The invention may reduce or eliminate the need for this overcapacity. A system to monitor the stroke of the actuator and other brake system functions that could give a warning if the brake system is not functioning within parameters could reduce or eliminate the need for over-capacity.

Figure 6:
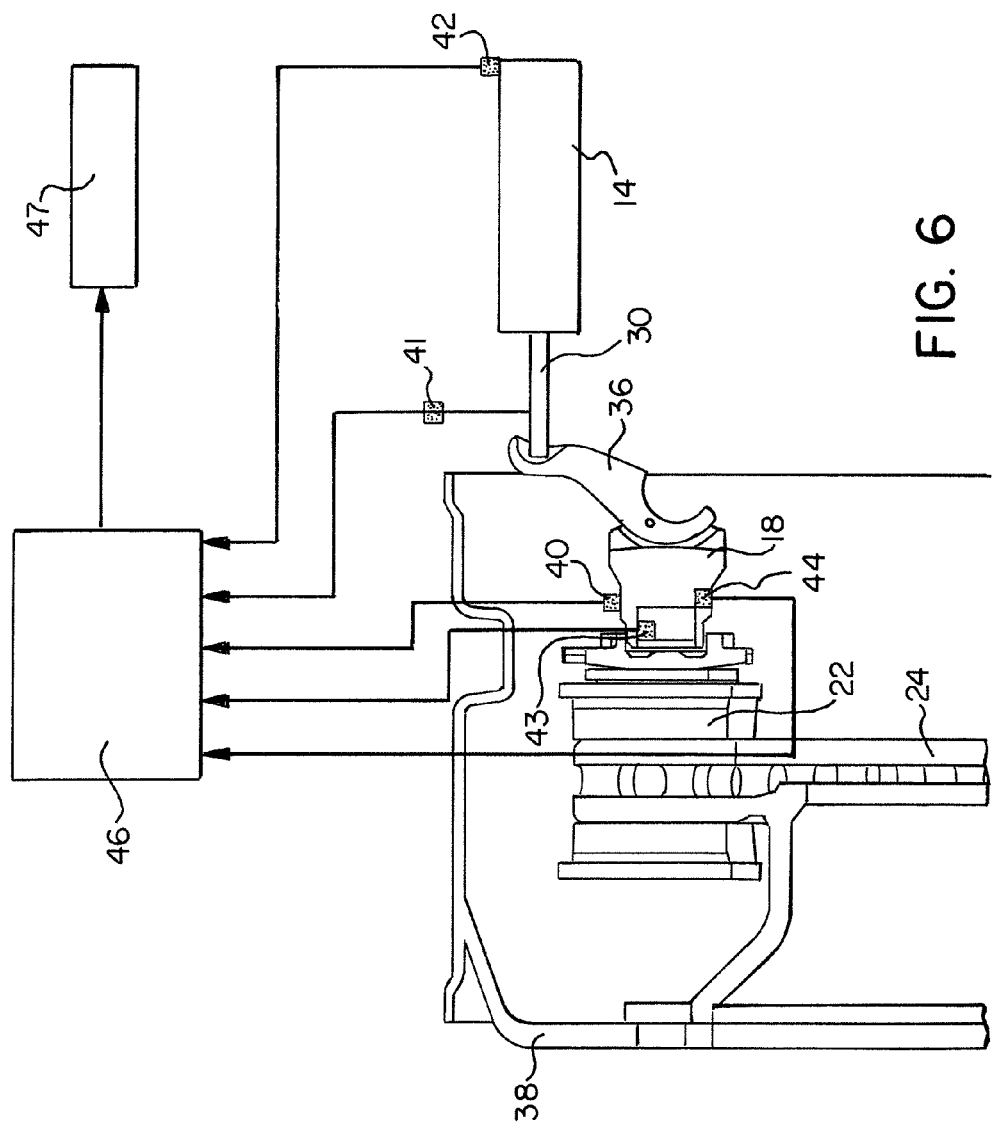
FIG. 6 is a side view of the compact brake system, illustrated in FIG. 1, installed on a disc brake caliper showing schematically a sensor system attached.
Figure 7:
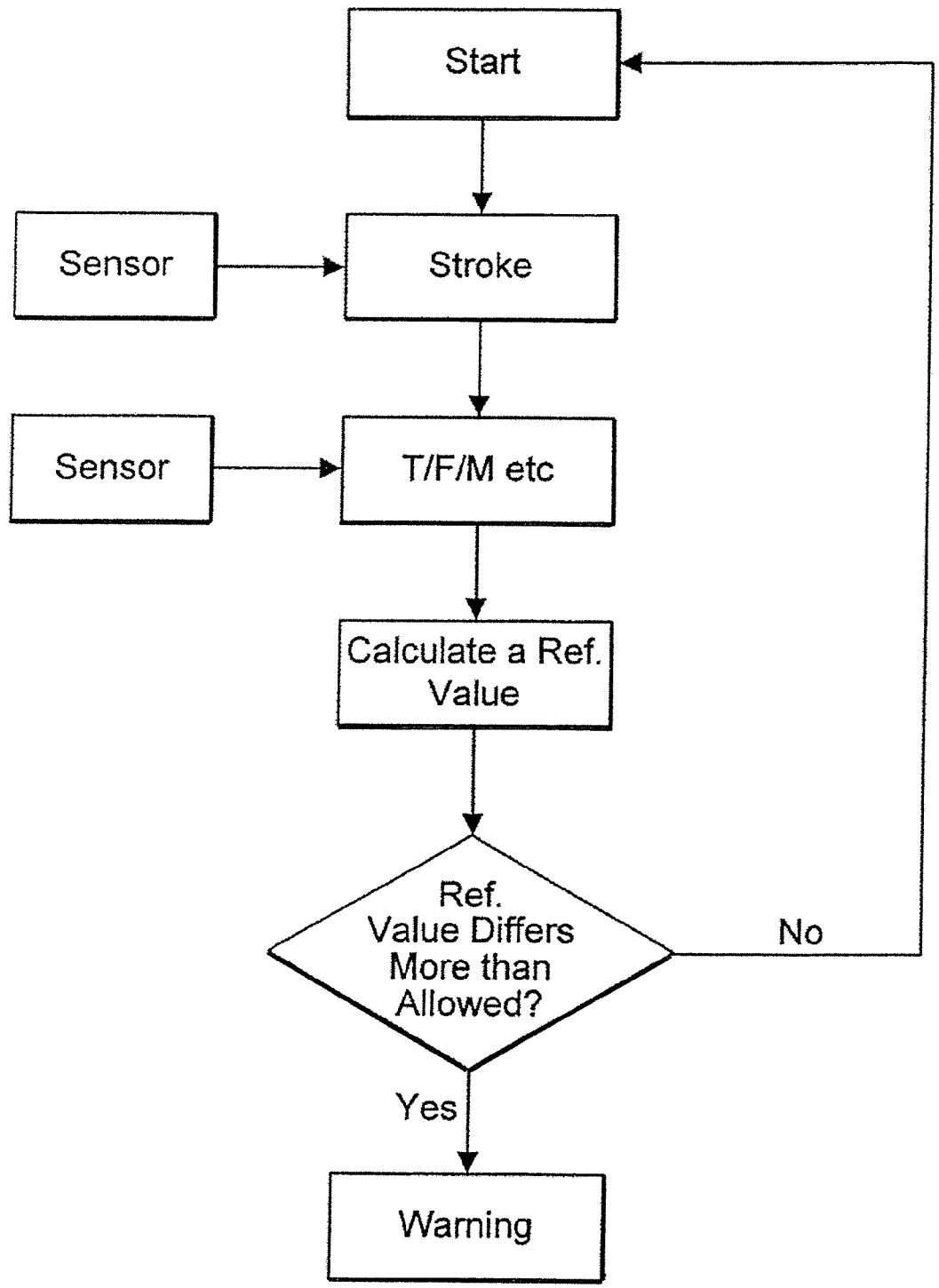
FIG. 7 is a block diagram illustrating the operation of the attached sensor system for the compact brake system of FIG. 1.

Such a sensing system is referred to generally in FIGS. 6 and 7. In FIG. 6, a brake system installed on a disc brake caliper 38 has such a sensor system attached. To check the function of each brake system, a number of sensors 40-44 may be arranged at different locations on or around the brake system. The stroke of the brake mechanism is sensed either by a sensor 40 placed at the application unit 18 or a sensor 41 placed at the actuator 14. Furthermore, the pressure of the actuator 14 may be sensed by a sensor 42 at the actuator. The clamp force and the brake torque may be sensed by sensors 43 and 44 at the application unit 18. A person skilled in the art realizes that there are a number of alternative sensors possibilities for use in sensing different conditions of the disc brake.

The signals of the sensors 40-44 are given to a processing unit (CPU) 46. In the CPU 46, the received signals are processed and if necessary a warning signal is issued to a display 47 or any other suitable means. The CPU 46 may be an existing CPU of the vehicle or a CPU only used for the braking system.

By sensing the stroke and one or more further features correlated with the stroke it is possible to establish if the stroke is within the allowable limits. By sensing both the stroke and at least one of the correlated features, a reference value for the expected stroke may be established, taking other internal or external factors into account. The correlated feature may be one or more of the pressure of the actuator 14, the braking force, the braking torque, wear of the friction material 22 or the wheel speed, indicating possible slip. These correlated features may be sensed by one of the indicated sensors 40-44, or by any other means. A sensor may also be used to calculate the application force $F_2$ applied.

In practice each stroke value should ideally correspond to a value of at least one of the correlated features, irrespective of whether it is a pressure, force, torque or other feature. Thus, the correlated values are a function of inter alia the stroke but the ideal value will vary depending on the specific conditions regarding wear of the brake pads, temperatures, etc. Therefore, the changing value has to be taken account for by the CPU 46. During a sensing cycle the correlated feature or features are used to calculate an ideal value, taking the specific conditions into account, and the sensed stroke is compared to the ideal value of the stroke. Then, a warning signal will be given if the difference between the sensed and the expected value exceeds a pre-determined value.

In FIG. 7, a sensing cycle is generally shown in a block diagram. As indicated in the block diagram the sensing system may function in the following way. First, the values of a sensed stroke and at least one correlated feature are registered. Then a reference value or ideal value is calculated and compared with said registered values. In calculating the reference value a number of further factors can be taken into account, such as the temperature of the brake pads, the wear of the pads, etc. The temperature may be sensed or calculated based on available information such as pad wear, number and length of brake applications, or temperature or environment.

The reference value is the value received with normally functioning brakes, taken into account the further factors. The reference value will change depending on these further factors and, thus, the reference value is a function of said further factors. If the registered value differs more than a pre-determined amount from the reference value a warning signal is issued. If the difference is less than the pre-determined amount a new sensing cycle will start.

The warning signal may be given in the form of a light, a sound and/or be shown on a display. The warning signal may also indicate from which brake the signal originates. The warning signal is an indication that something is wrong in the braking system. The normal reaction after a warning signal is to check the brake in question and repair or replace the defective part or parts. Thus, the immediacy and safety provided by a sensing system may reduce or eliminate the need to have a built in over-capacity in brake systems.

The stroke and force sensors of the sensing system may also be effecting in overcoming the problems associated with compounding. In particular, when used in conjunction with an electronic braking system (EBS), the sensors could monitor the braking system to prevent compounding. Thus the sensors will serve both an active and passive purpose as they also warn for malfunctions.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A brake system for a vehicle comprising:
   an actuator comprising a service chamber and a parking chamber, said actuator operating along an actuator axis through said service chamber and said parking chamber, and said actuator having an overall length of less than approximately 200 millimeters measured along the actuator axis, and said actuator having a service stroke length and a parking stroke length where the parking stroke length is less than the service stroke length;
   an application unit actuated by said actuator, said application unit including a force multiplying device for generating an application force, and wherein the application force is exerted in a direction substantially parallel to the actuator axis; and
   a push rod transmitting an actuation force over the service stroke length and the parking stroke length to said application unit;
   an anti-compounding valve preventing overload associated with compounding of a service force and a parking force when the actuation force is transmitted by the push rod over the service stroke length and the parking stroke length.

2. The brake system of claim 1, wherein the application force is exerted in a direction less than 10 degrees from parallel with respect to the actuator axis.

3. The brake system of claim 1, wherein, said actuator has an overall length of less than approximately 182 millimeters measured along the actuation axis.

4. The brake system of claim 1, wherein, said actuator has an overall length of less than approximately 160 millimeters measured along the actuation axis.

5. The brake system of claim 1, wherein the brake system has a center of gravity closer to a caliper interface than a brake system with an actuator having an overall length of greater than approximately 200 millimeters measured along the actuator axis.

6. The brake system of claim 1, wherein, said service and parking stroke lengths are cumulatively less than approximately 57 millimeters.

7. The brake system of claim 1, wherein, said service and parking stroke lengths are cumulatively less than approximately 40 millimeters.

8. The brake system of claim 1, wherein, the parking stroke length is less than approximately 30 millimeters.

9. The brake system of claim 1, further comprising stroke and force sensors.

10. The brake system of claim 1, wherein, the force multiplying device is adapted to be responsive to the actuation force.

11. The brake system of claim 10, wherein, said force multiplying device comprises a lever and at least two bearing surfaces.

12. The brake system of claim 11, wherein, the lever and the at least two bearing surfaces are exchangeable in order to alter the force multiplication of said application unit.

13. The brake system of claim 12, wherein, an active length of the lever or at least one of the at least two bearing surfaces is adapted to the actuation force.

14. The brake system of claim 12, wherein, an active length of the lever or at least one of the at least two bearing surfaces is adapted to provide a constant actuator force independent of the stroke length of the actuator acting on the lever.

15. The brake system of claim 1, wherein, said actuator is a pneumatic cylinder, the actuator force is generated by compressed air entering the service chamber and the parking chamber, and said actuation force is a function of the diameter of the service chamber or the parking chamber.

16. The brake system of claim 15, wherein, the service chamber has a diameter of greater than approximately 191 millimeters.

17. The brake system of claim 15, wherein, the service chamber has a diameter of greater than approximately 213 millimeters.

18. The brake system of claim 15, wherein, the parking chamber has a diameter of less than approximately 213 millimeters.

19. The brake system of claim 1, wherein, the parking chamber comprises a piston parking brake.

20. The brake system of claim 19, wherein, the piston parking brake has a parking stroke length of less than approximately 30 millimeters.

21. The brake system of claim 1, further comprising sensors.

22. The brake system of claim 21, wherein, said sensors are inbuilt in said actuator.

23. The brake system of claim 21, wherein, said sensors are anti-lock brake sensors.

24. The brake system of claim 21, further comprising a sensing system.

25. The brake system of claim 24, wherein, said sensing system comprises a stroke sensor sensing the position of an actuating stroke.

26. The brake system of claim 25, wherein, said sensing system further comprises a force sensor sensing an applied force the brake system and correlated with the actuating stroke, the system comparing the value of the actuating stroke to a reference value for said sensed applied force of the brake system and issuing a warning signal if the actual value of the actuation stroke deviates more than a predetermined value from the reference value, wherein overload associated with compounding of a service force and a parking force is avoided.

* * * * *